March 13, 1934.   C. W. KEMPER ET AL   1,950,893
SECTIONAL CABLE CLAMP
Filed June 13, 1932
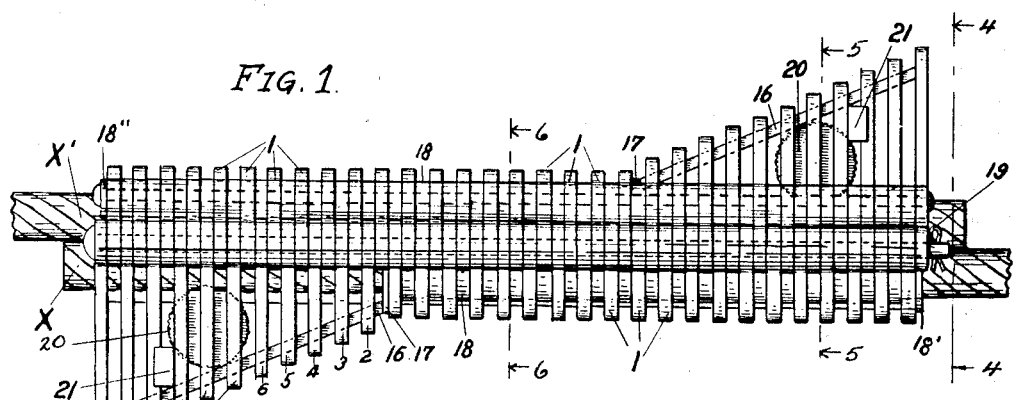
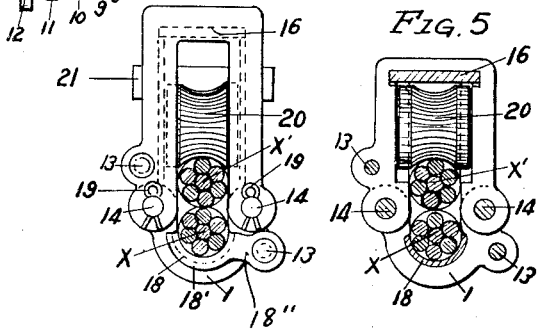
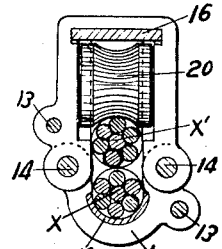
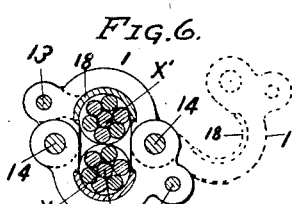
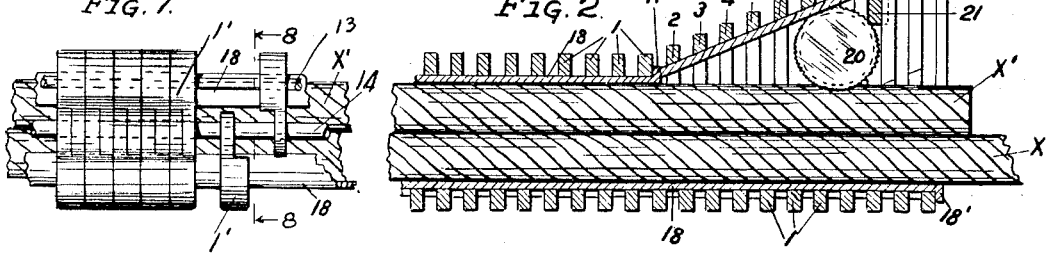
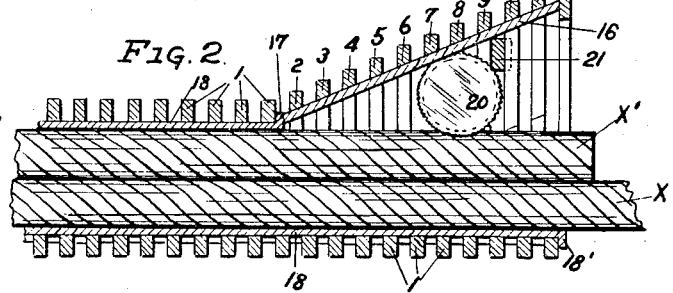
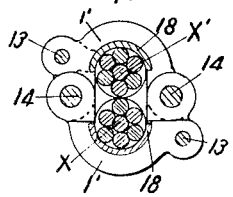
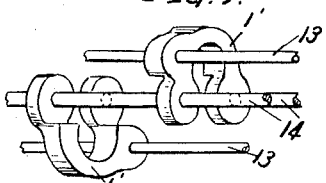
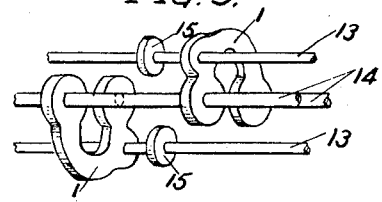
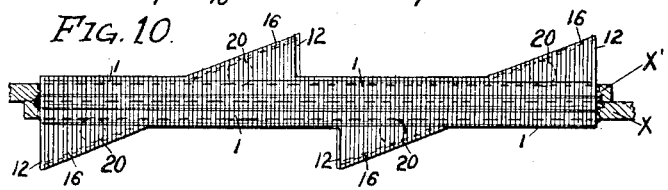
INVENTOR.
CHARLES W. KEMPER
JOHN T. KEMPER
BY Miller Boykin & Bried
ATTORNEYS.

Patented Mar. 13, 1934

1,950,893

UNITED STATES PATENT OFFICE 1,950,893

SECTIONAL CABLE CLAMP

Charles W. Kemper and John T. Kemper, Hayward, Calif.

Application June 13, 1932, Serial No. 616,814

14 Claims. (Cl. 24—136)

This invention relates to cable clamps of the type shown in our U. S. Patent No. 1,811,942, and has for its principal object a construction whereby the complete clamp is assembled of small units which may be stamped from thin metal or otherwise cheaply produced. Other objects and advantages of the construction will appear in the following description and in the accompanying drawing.

In the drawing Fig. 1 is a side view of our improved clamp applied to two cables for clamping them together.

Fig. 2 is a vertical section of the right-hand portion of Fig. 1.

Fig. 3 is a perspective view showing a few of the units separated from one another on their aligning rods.

Fig. 4 is an end view of Fig. 1 as seen from the line 4—4.

Fig. 5 is a cross section of Fig. 1 as seen from the line 5—5.

Fig. 6 is a cross section of Fig. 1 as seen from the line 6—6.

Fig. 7 is a side elevation of the central portion of an assembled body made of offset or shouldered units instead of flat sheet units.

Fig. 8 is a cross section of Fig. 7 taken along the line 8—8.

Fig. 9 is a perspective view similar to that of Fig. 3 but showing the units of the construction used in Fig. 7.

Fig. 10 is a diagrammatic side view showing how a multiple clamp is built up with our elements.

The ultimate end of the invention is to obtain an elongated tubular body with means therein for clamping a cable, or a pair of cables together, and at the same time provide a side opening for insertion or removal of the cable. This result is obtained in our present construction through the use of a large number of transversely extending plates held together with pins, and by which a complete clamp is quickly assembled of the plate units (which may be simple stampings) and a completed body of great strength is secured.

In Fig. 1 the two cables which it is desired to clamp together are shown at X, X' extending through the body, and the body is formed of a number of flat plates or sections 1, 2, 3, 4, 5, 6, 7, 8, 9, 10, 11, 12, each of yoke shape as shown in Figs. 4, 5 and 6, apertured with two holes each at their ends and threaded on long pins 13, 14 in staggered confronting relation so as to make a long tubular body. Washers 15 of same thickness as the plates are used on pins 13 to preserve regularity of spacing, though instead of washers the plates may be forgings or castings as shown in Fig. 7 at 1' wherein each has a shoulder or offset portion completely filling the spaces so that no washers are needed and the finished device presents a smooth solid outward appearance.

All of plates 1 are of the same size, but plates 2 to 12 are progressively larger so as to build out a slanted wall against the inside of which is preferably seated a steel or other metal lining plate 16 preferably recessed into the sides of the yoke-like plates as shown in Fig. 5 so it will stay in place, and at its outer end abutting the last plate 12 made smaller internally for that purpose, and at its inner end abutting the outwardly hooked end 17 of a liner 18 similarly seated in the straight run plates 1. This liner 18 is curved in cross section to seat the cable and is also outwardly hooked at its outer end as at 18' to aid in locking all of the plates together and hold the lining in place, though pins 13 which extend straight through the entire assemblage are headed over on both ends as indicated. Pins 14, however, or at least one of them is made withdrawable and held in place by a cotter pin 19 or nut or slight riveting over, as it must be removed so that the whole device may be opened like a book to receive the cables or for removing them when desired. In addition to the flanging over of the liners as at 18' either one or both ends of the liners may have an outwardly extending ear through which the pins or bolts pass and are headed over. One of these ears is shown at 18'' in Fig. 4. Thus the sections, liners, pins or bolts form an interlocked unit when all assembled.

In Fig. 6 the dotted portion indicates the way the device opens when one of the pins 14 is withdrawn.

The cables are clamped together by wedges or toothed rollers as at 20 wedging between the slanted liners 16 and the cables. These rollers are driven "home" with a hammer and punch, and are continually tightened by outward pulling of the extending cables or ropes, though for additional precaution we may pass a strip of metal 21 through the device just in back of the rollers and bend its ends over so it will not fall out.

While it is usually more than sufficient to have a gripping roller at each end of the device, yet for very abnormal strains on the cables it is possible to assemble a double set of plates in the manner indicated in Fig. 10 so as to have two gripping rollers working on each bight.

With the construction shown in Fig. 7, instead of the strip of metal 21 shown in Fig. 1 a simple cotter pin passed through a hole in the body may be used to hold the roller in or out.

Having thus described our special sectional construction it will be evident that it may be applied to clamps as herein shown, or to the strain clamp of our copending patent application filed simultaneously herewith under Serial No. 616,815, or any similar cable and wire clamps of considerable variation in other features, also that instead of securing the two opposite groups of transverse sections together with pins they may be welded together after assemblage, especially in the modification shown in Fig. 7 of the drawing.

We therefore claim:

1. A cable clamp comprising a body with a cable passageway extending therethrough, means within the body for clamping the cable, said body formed of a plurality of pairs of transversely extending sections and longitudinally extending means holding the sections together.

2. A cable clamp comprising a body with a cable passageway extending therethrough, means within the body for clamping the cable, said body formed of a plurality of transversely extending plates and longitudinally extending pins holding the plates together.

3. A cable clamp comprising a body with a cable passageway extending therethrough, means within the body for clamping the cable, said body formed of a plurality of pairs of transversely extending yokes in confronting relation, and pins extending longitudinally of the body on which said yokes are threaded.

4. A cable clamp comprising a body with a cable passageway extending therethrough, means within the body for clamping the cable, said body formed of a plurality of pairs of transversely extending yokes in confronting relation, pins extending longitudinally of the body on which said yokes are threaded, the ends of the yokes of each pair being in overlapping relation, and the pins forming hinge means for opening the body like a book to receive the cable from the side.

5. A cable clamp comprising a body with a cable passageway extending therethrough, means within the body for clamping the cable, said body formed of a plurality of pairs of transversely extending sections and longitudinally extending liners seated within the cable passage said liners comprising separate members disposed respectively on opposite sides of the cable passageway and means holding the sections together.

6. In a structure as specified in claim 1, the sections toward one end of the body becoming progressively larger to afford a housing for the cable clamping means.

7. In a structure as specified in claim 1, the sections toward one end of the body becoming progressively larger to afford a housing for the cable clamping means, a liner against the inner slanted wall thus formed and the cable clamping means comprising a roller operating against said liner.

8. A cable clamp comprising a body with a cable passageway therethrough, and means within the body clamping the cable, said body formed of a plurality of pairs of transversely extending sections, and means holding the sections together.

9. A cable clamp comprising a body with a cable passageway therethrough, and means within the body clamping the cable, said body formed of a plurality of pairs of transversely extending sections and means holding the sections together, and means adapting the assembled body to open along the side like a book for insertion of the cable.

10. A cable clamp comprising an elongated body with a single passageway for a plurality of cables in parallel, side by side relation extending therethrough, a plurality of cable gripping devices on opposite sides of said body adapted to tighten with increased strain on the cables the cable gripping devices on one side of the body adapted to engage one of said cables only and the cable gripping devices on the opposite side adapted to engage another of said cables only.

11. A cable clamp comprising an elongated body with a single passageway for a plurality of cables extending therethrough, a plurality of separate cable gripping devices on opposite sides each of said body adapted to tighten with increased strain on the cables, said devices arranged in staggered relation along the body.

12. A cable clamp comprising a body with a cable passageway extending therethrough, means within the body for clamping the cable, said body being divided transversely of the passageway into separate sections and each section comprising a pair of separate members forming opposite sides of said passageway and means holding said sections together.

13. A cable clamp comprising a body with a cable passageway extending therethrough, means within the body for clamping the cable, said body being divided transversely of the passageway into separate sections and each section comprising a pair of separate members forming opposite sides of said passageway and means holding said sections together in abutting relation.

14. A cable clamp comprising an elongated body with a cable passageway extending longitudinally therethrough, means within the body for clamping the cable, said body being divided transversely of its length into a plurality of sections, and a pin extending lengthwise of the body from end to end thereof holding the sections together.

CHARLES W. KEMPER.
JOHN T. KEMPER.